United States Patent
Pflueger

(10) Patent No.: US 10,525,396 B2
(45) Date of Patent: Jan. 7, 2020

(54) FILTER ELEMENT AND FILTER ASSEMBLY

(71) Applicant: MANN+HUMMEL GmbH, Ludwigsburg (DE)

(72) Inventor: Frank Pflueger, Sachsenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 15/970,302

(22) Filed: May 3, 2018

(65) Prior Publication Data
US 2018/0250625 A1  Sep. 6, 2018

Related U.S. Application Data

(63) Continuation of application No. PCT/EP2016/073753, filed on Oct. 5, 2016.

(30) Foreign Application Priority Data

Nov. 4, 2015 (DE) .......................... 10 2015 014 113

(51) Int. Cl.
*B01D 46/52* (2006.01)
*B01D 29/07* (2006.01)
(Continued)

(52) U.S. Cl.
CPC ........... *B01D 46/522* (2013.01); *B01D 29/07* (2013.01); *B01D 29/92* (2013.01); *B01D 46/0002* (2013.01); *B01D 46/0047* (2013.01); *B01D 2201/122* (2013.01); *B01D 2201/293* (2013.01); *B01D 2201/298* (2013.01);
(Continued)

(58) Field of Classification Search
CPC .. B01D 46/522; B01D 29/92; B01D 46/0002; B01D 29/925; B01D 29/21; B01D 29/111; B01D 29/07; B01D 29/012; B01D 46/2414; B01D 46/10; B01D 46/0047; B01D 2201/298; B01D 2271/027; B01D 2201/347; B01D 2267/30; B01D 2267/60;
(Continued)

(56) References Cited

U.S. PATENT DOCUMENTS 5,858,227 A    1/1999 Stone et al.
8,051,989 B1 * 11/2011 Tondreau ............... B01D 29/21
                                                        210/487
(Continued)

FOREIGN PATENT DOCUMENTS

DE    102013217333 A1    5/2014
EP        0081297 A1    6/1983

*Primary Examiner* — Madeline Gonzalez
(74) *Attorney, Agent, or Firm* — James Hasselbeck

(57) ABSTRACT

A filter element is provided with a support frame provided with a first end disk section and a second end disk section. A folded filter medium is connected to the support frame and arranged between the first end disk section and the second end disk section of the support frame. The first end disk section or the second end disk section has a face facing away from the filter medium. The support frame is provided with a fluid guiding channel that guides, when a fluid flow passes through the filter medium, the fluid along the face facing away from the filter medium. A filter assembly with such a filter element and a filter receptacle in which the filter element is exchangeably arranged is provided.

9 Claims, 10 Drawing Sheets

(51) Int. Cl.
   *B01D 29/92* (2006.01)
   *B01D 46/00* (2006.01)
(52) U.S. Cl.
   CPC .... *B01D 2201/347* (2013.01); *B01D 2267/30* (2013.01); *B01D 2267/60* (2013.01); *B01D 2271/027* (2013.01)
(58) Field of Classification Search
   CPC .......... B01D 2201/293; B01D 2201/60; B01D 2201/122; B01D 2201/291
   USPC ................... 210/483, 493.1, 493.5, 484, 487
   See application file for complete search history.

(56) References Cited

U.S. PATENT DOCUMENTS

| | | |
|---|---|---|
| 2009/0313960 A1 | 12/2009 | Felber et al. |
| 2014/0076795 A1 | 3/2014 | Perkarsky et al. |

* cited by examiner

FILTER ELEMENT AND FILTER ASSEMBLY

CROSS-REFERENCE TO RELATED APPLICATIONS

This application is a continuation application of international application No. PCT/EP2016/073753 having an international filing date of Oct. 5, 2016 and designating the United States, the international application claiming a priority date of Nov. 4, 2015 based on prior filed German patent application No. 10 2015 014 113.9, the entire contents of the aforesaid international application and the aforesaid German patent application being incorporated herein by reference.

BACKGROUND OF THE INVENTION

The invention concerns a filter element as well as a filter assembly with such a filter element.

In the automotive field, often gases like air or liquid operating media, for example, fuels like gasoline, diesel, lubricants like oil but also urea solutions are to be freed from contaminants. For this purpose, usually filter elements are employed which are inserted into a filter housing or a filter receptacle. The filter elements themselves comprise in this context a usually flat and folded filter medium which is provided between end disks or end caps and is flowed through radially. Known are in particular cylinder-shaped housings and filter element geometries. Usually, due to the installation situations, geometric requirements exist in regard to the respective filter element, the filter receptacle, and inlet and outlet lines for clean and raw fluid. It is desirable to employ a filter surface area as large as possible in a small installation space.

DE 10 2013 218 694 A1 discloses a filter assembly with a housing that comprises a first cover and a second cover, a grid located in the housing and comprising ribs and bands connected to each other, and a filter medium that is formed as one piece together with the grid and that comprises a circumferential width which is located between the covers.

DE 10 2013 217 333 A1 discloses an in-tank filter for filtering a liquid with a first filter side and a second filter side. Between them, a receiving space is arranged. Moreover, filtered liquid can be discharged from the receiving space by means of a connector. For forming a housing, an annular circumferential wall is provided which surrounds the first filter side and the second filter side, wherein at least one filter side comprises a pleated filter medium.

SUMMARY OF THE INVENTION

It is therefore object of the invention to provide an improved filter element.

Accordingly, a filter element with a folded filter medium and a support frame to which the filter medium is connected is proposed, wherein the filter medium is arranged between a first end disk section and a second end disk section of the support frame, and wherein the support frame comprises a fluid guiding channel which is configured to guide, upon flow of a fluid through the filter medium, the fluid in such a way that it can be guided along a face of one of the end disk sections which is facing away from the filter medium.

The filter element is configured to filter fluids, for example, air or other gases, liquids, in particular liquid operating media of a vehicle, in particular of a motor vehicle, like oil, water, diesel, gasoline, kerosene or urea solution. In particular, the filter element is an air filter element. The filter element can be used in motor vehicles, watercraft, rail vehicles, agricultural vehicles, construction machines, aircraft, or the like. Moreover, the filter element can also be used in immobile applications, for example, in building technology.

Insofar, the filter element in one embodiment is configured as an air filter element for combustion air of an internal combustion engine.

In a further embodiment, the filter element is configured as liquid filter. The filter medium is then in particular adapted to filter liquid operating media of a motor vehicle.

The filter medium can comprise, for example, a synthetic nonwoven material, paper, laid web, or woven fabric. The filter medium can be single-layered or multi-layered. The filter medium can be pleated. The filter medium forms a folded bellows folded in a zigzag shape or accordion shape. In particular, the support frame is connected by material fusion to the filter medium, for example, glued or welded. In particular in an embodiment as a liquid filter, a fixed connection of the support frame with the filter medium can improve the stability of the filter medium when being flowed through and reduce deformation because the employed filter media for liquid filtration may have a reduced inherent strength in comparison to filter media for intake air filtration, for example.

In embodiments, fold sections of the filter medium or of the folded bellows can comprise different or variable fold heights. In this way, the available installation space can be optimally utilized. Fold height is to be understood, for example, as the spacing between neighboring fold edges of a fold section.

The folded bellows can comprise a circular arc-shaped outer geometry which is formed by an arc-shaped, in particular circular arc-shaped, envelope of the fold edges. One can also speak of an endless folded bellows.

The filter medium, which comprises a geometric volume, for example, as fold pack or bellows, and the fluid guiding channel as a part of the filter element are preferably configured such that, in proper use of the filter element, a flow of fluid is realized through the corresponding volume, on the one hand, and past the volume or the filter medium in opposite direction, on the other hand. One can say that a flow reversal takes place to a certain degree within the filter element. This can be realized in particular by means of the fluid guiding channel that deflects a fluid flow direction at least partially and/or guides the fluid along a deflected fluid flow direction.

The "enclosed volume" enclosed by the outer boundary surfaces of the filter medium can be formed in particular by trimming or shaping of folds.

The filter element comprises in particular a raw side and a clean side, wherein in operation of the filter element the fluid to be purified flows through the filter medium from the raw side to the clean side. Preferably, the fluid guiding channel is configured to divert the fluid upon flow of the fluid through the filter medium in such a way that it can be guided along a face of the second end disk section which is facing away from the filter medium. In operation of the filter element, the fluid flows then externally, i.e., facing away from the folded bellows, along the second end disk section. The deflection can be realized in a collecting chamber of the filter element which is present downstream of the filter medium.

In embodiments, the support frame and/or the end disks are connected fixedly to the filter medium. This means, for example, that the support frame and the filter medium cannot be separated from each other without being destroyed.

The end disk sections, for example, can be fixedly connected with the fold profiles of the folded bellows that are oriented perpendicularly to a longitudinal direction of the folded bellows. Due to the fixed connection of the support frame and the filter medium, the folded bellows can be supported well at the end face and at the length side. In this way, a collapse of the filter medium is prevented. In comparison to known filter elements, in particular compared to those with a folded bellows folded in a star shape, an increased surface area of the folded bellows can be achieved when using a variable fold height.

In an alternative embodiment, the end fold sections each are connected to one end disk or end disk section, wherein then the folds of the fold pack extend perpendicularly to the longitudinal direction of the filter element.

In embodiments, the support frame is injection molded onto the filter medium by a plastics injection molding process. The support frame is in particular monolithic and comprises, in addition to the end disk sections, a rectangular frame section. The end folds of the filter medium can be connected to the frame section. The support frame is, for example, manufactured of a polyamide or an acrylonitrile butadiene styrene.

In embodiments, the fluid guiding channel is arranged such that one of the end disk sections is arranged between the fluid guiding channel and the filter medium. Preferably, the second end disk section is provided between the fluid guiding channel and the filter medium. The fluid guiding channel is formed preferably in the support frame.

In the embodiment, the fluid guiding channel is configured such that, upon flow of the fluid through the filter medium, the fluid is diverted such that an outflow direction of the fluid through the fluid guiding channel is arranged opposite to a flow-through direction of the fluid through the filter medium. Preferably, the outflow direction is rotated by 180° relative to the flow-through direction. The outflow direction can also be rotated at a slant and opposite to the flow-through direction, for example, at an angle of 130 to 170° relative to the flow-through direction.

In embodiments, the flow-through direction is arranged perpendicular to fold edges of the filter medium. Preferably, the fold edges extend in the longitudinal direction of the folded bellows. The flow-through direction is preferably positioned perpendicular to a central axis of the filter element.

In embodiments, the support frame and a housing element or cover element that is fixedly connected to the support frame, in particular welded or glued thereto, forms an outer closure or a housing of the filter element. The housing element is preferably an injection molded plastic component. In this way, it can be produced inexpensively in high quantities.

The housing element or cover element is not a required component. As an alternative, instead of the housing element to the rear, i.e., facing away from the folded bellows, a circumferentially extending sealing element can be provided for directly sealing the support frame relative to a filter receptacle of the filter element. Insofar, the cover is formed by a suitably shaped wall of a filter receptacle.

In embodiments, the filter element comprises a cover element which delimits a collecting chamber provided between the outflow side of the filter medium and the cover element. The collecting chamber, for example, is a clean fluid chamber and can be a part of the fluid guiding channel.

In embodiments, the filter element comprises a circular cylinder-shaped geometry and comprises a connecting socket, arranged at one of the end disk sections, for connecting the filter element to a filter receptacle, wherein the connecting socket is arranged centrally at the cylinder-shaped geometry. In this way, the filter element can be inserted into existing receptacles for filter elements with star-shaped folded bellows. This expands the field of use of the filter element. At the tubular connecting socket that comprises preferably a circular cross section geometry, preferably a flange with a circumferentially extending sealing element, in particular an O-ring, is provided for sealing relative to the filter receptacle. Preferably, the connecting socket is protruding, in particular perpendicularly, from the second end disk section at the top side. The connecting socket can alternatively have a rectangular cross section and/or protrude at a slant from the second end disk section.

In embodiments, the fluid guiding channel is fluidically connected with the connecting socket. The fluid guiding channel opens preferably laterally at an angle of 90° into the connecting socket. The fluid guiding channel can also be integrated into the connecting socket or can be formed by it.

In embodiments, the support frame comprises a support section arranged between the end disk sections and provided with support ribs for supporting fold sections of the filter medium. The support section is preferably positioned centrally between the end disk sections. The support ribs each extend preferably across a total length of the fold sections, i.e., up to a fold base of a filter fold formed by two neighboring fold sections. In this way, a collapse of the filter medium upon flow of the fluid through it is prevented. In this way, also very thin and unstable filter media can be employed. In particular, the support section with the end disk sections and the frame section is injection molded by an injection molding process onto the filter medium as one piece.

The filter element with integrated fluid flow deflection is configured in particular as an exchangeable filter and is configured to be exchangeable as a whole in a filter assembly. By means of the fluid guiding channel, a star shape folding of the filter medium can be prevented while simultaneously a cylindrical outer shape of the filter element is provided.

Moreover, a filter assembly with such a filter element and a filter receptacle in which the filter element is received in an exchangeable way is proposed. The filter receptacle can also be referred to as filter housing. The filter receptacle comprises preferably a receiving element into which the filter element can be inserted and a removable cover for fluid-tight closure of the receiving element.

Further possible implementations of the filter element and/or of the filter assembly comprise also combinations, not explicitly mentioned, of features or embodiments which have been described above or in the following with regard to exemplary embodiments. In this context, a person of skill in the art will also add individual aspects as improvements or supplements to the respective basic form of the filter element and/or of the filter assembly.

Further configurations of the filter element and/or of the filter assembly are subject matter of the dependent claims as well as of the exemplary embodiments of the filter element and/or of the filter assembly described in the following. Furthermore, the filter element and/or the filter assembly will be explained in more detail with the aid of exemplary embodiments with reference to the attached Figures.

BRIEF DESCRIPTION OF THE DRAWINGS

In the Figures, same reference characters identify same or functionally the same elements, inasmuch as nothing to the contrary is indicated.

DESCRIPTION OF PREFERRED EMBODIMENTS

Figure 1:
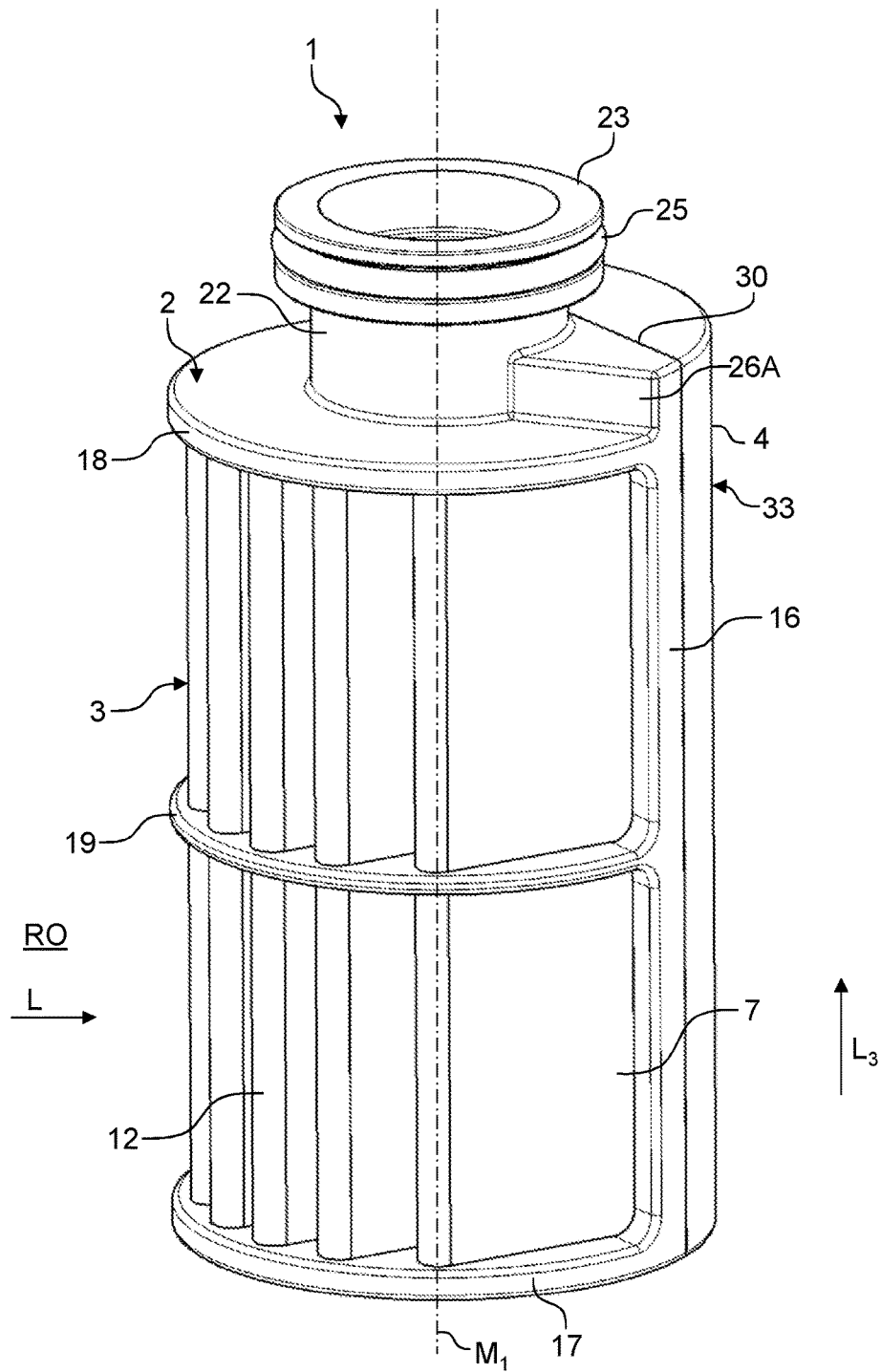
FIG. 1 shows a schematic, perspective view of an embodiment of a filter element.
Figure 2:
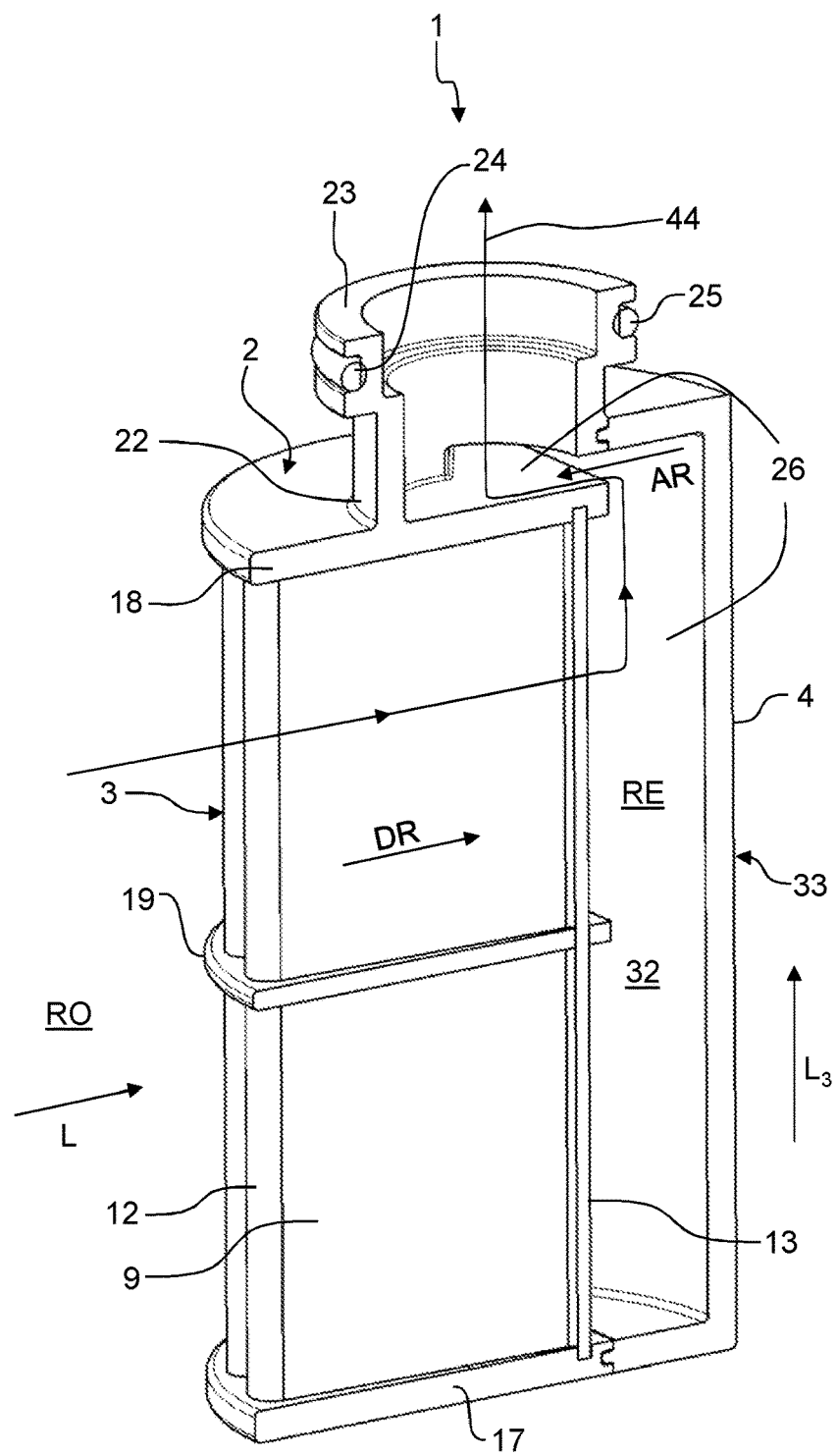
FIG. 2 shows a schematic, perspective section view of the filter element according to FIG. 1.
Figure 3:
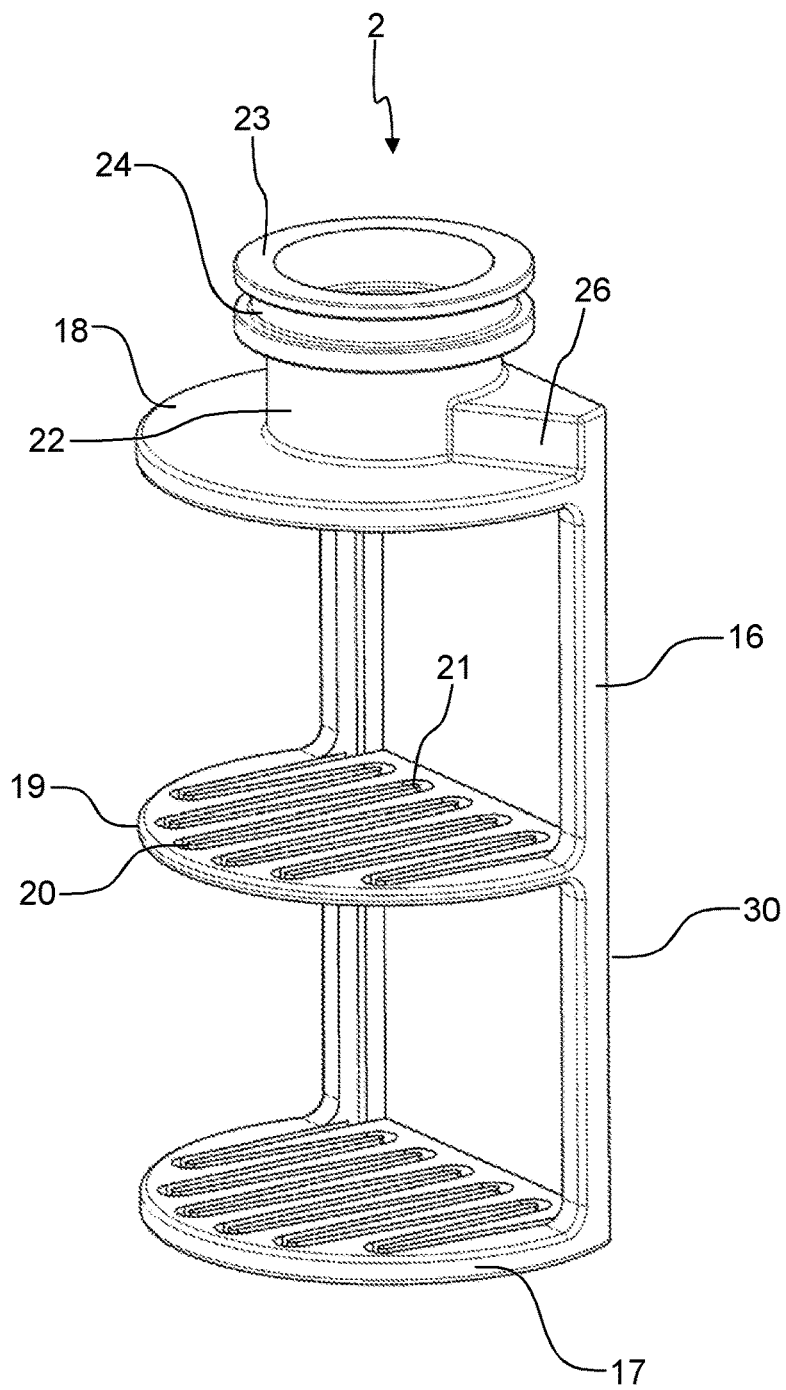
FIG. 3 is a schematic, perspective view of an embodiment of a support frame for the filter element according to FIG. 1.
Figure 4:
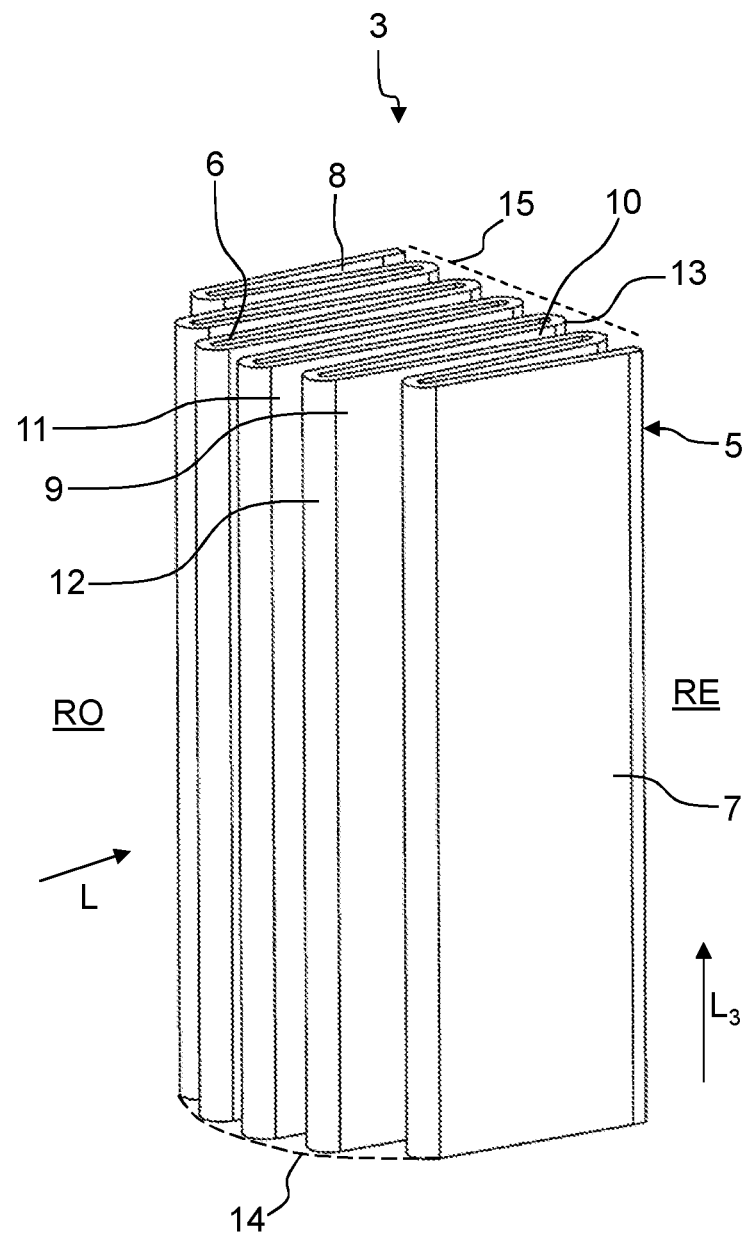
FIG. 4 shows a schematic, perspective view of an embodiment of a folded bellows for the filter element according to FIG. 1.
Figure 5:
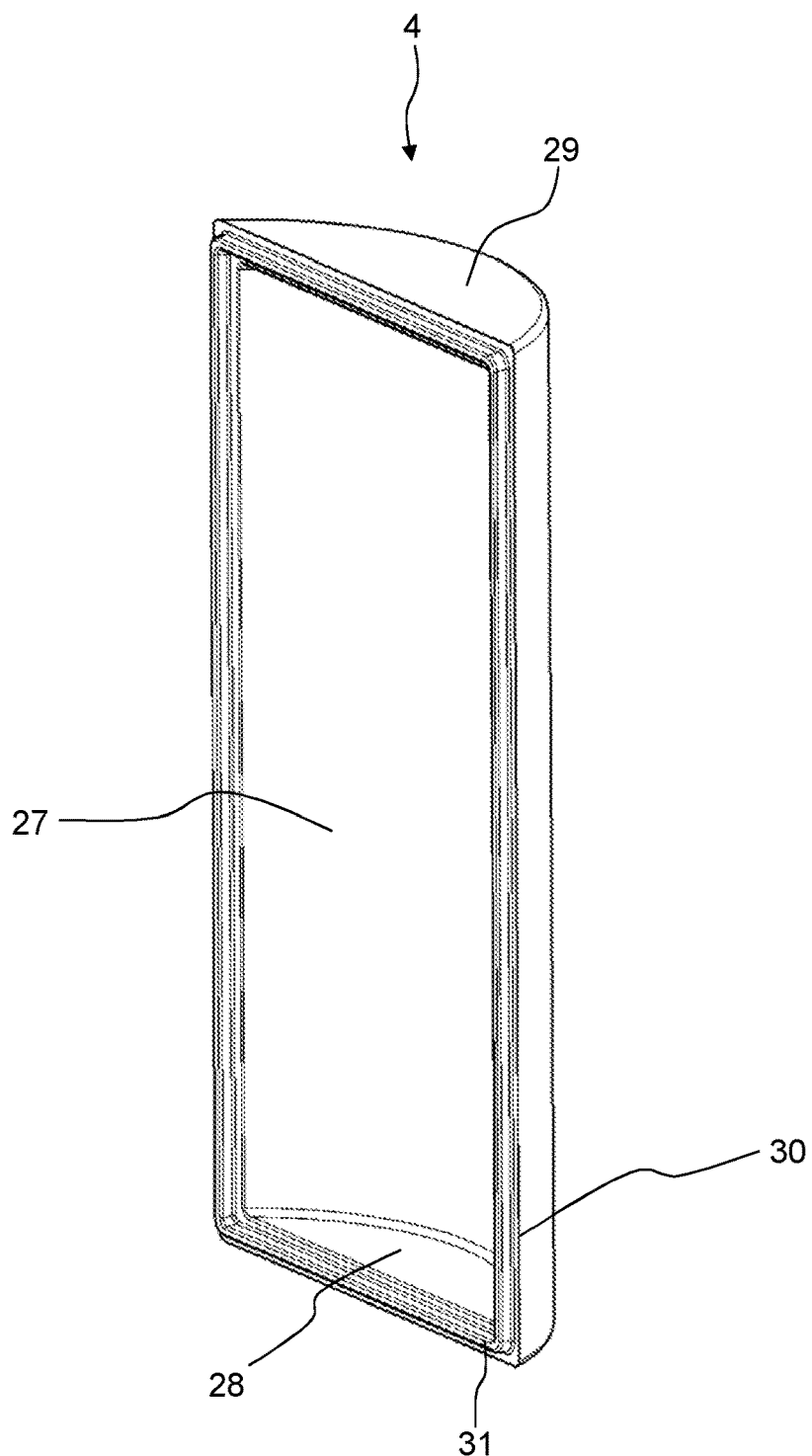
FIG. 5 shows a schematic, perspective view of an embodiment of a housing element for the filter element according to FIG. 1.

FIG. 1 shows a schematic, perspective view of an embodiment of a filter element 1. FIG. 2 shows a schematic, perspective section view of the filter element 1 according to FIG. 1. FIG. 3 shows a schematic, perspective view of an embodiment of a support frame 2 for the filter element 1 according to FIG. 1. FIG. 4 shows a schematic, perspective view of an embodiment of a folded bellows 3 for the filter element 1 according to FIG. 1. FIG. 5 shows a schematic, perspective view of an embodiment of a housing element 4 for the filter element 1 according to FIG. 1. In the following, reference is being had simultaneously to FIGS. 1 through 5.

The filter element 1 is configured to filter fluids L, for example, air or another gas, liquids, in particular liquid operating media of a vehicle, in particular of a motor vehicle, like oil, water, diesel, gasoline, kerosene, or urea solution. In particular, the filter element 1 is an air filter element. The filter element 1 can be used in motor vehicles, watercraft, rail vehicles, agricultural vehicles, construction machines, aircraft, or the like. Moreover, the filter element 1 can also be used in immobile applications, for example, in building technology.

As shown in FIG. 4, a folded bellows 3 of the filter element 1 is formed of a folded filter medium 5. In the orientation of FIG. 4, fold profiles 6 can be seen at the top on the folded bellows 3. The folded bellows 3 comprises two end folds 7, 8 between which a plurality of fold sections 9, 10, 11 are arranged, of which in FIG. 4 only three are provided with a reference character. The fold sections 9, 10, 11 are separated from each other by fold edges 12, 13 of which in FIG. 4 only two are provided with a reference character. The filter medium 5 is in this context folded along the fold edges 12, 13 such that it is formed in a zigzag shape or accordion shape. Instead of folds, the filter medium 5 can also be provided with bends or corrugations. The filter medium 5 can be, for example, a synthetic nonwoven material, paper, laid web, or woven fabric. The filter medium 5 can be single-layered or multi-layered.

As can be seen also in FIG. 4, the fold sections 9, 10, 11 comprise different fold heights. Fold height is to be understood as the spacing between fold edges 12, 13 of a fold section 9, 10, 11. The fold edges 12 can be referred to as outer or first fold edges. The fold edges 13 can be referred to as inner or second fold edges. FIG. 4 shows a first or outer envelope 14 of the fold edges 12 and a second or inner envelope 15 of the fold edges 13. The first envelope 14 can be arc-shaped, in particular circular arc-shaped, and the second envelope 15 can be a straight line. The fold edges 12, 13 extend in a longitudinal direction $L_3$ of the folded bellows 3.

The filter medium 5 or the folded bellows 3 encloses a geometric volume that corresponds, as indicated in FIG. 4, to a cylinder wherein the base surface is formed by the end folds 7, 8 and the envelopes 13, 14 and wherein the height is extending along the longitudinal direction $L_3$.

In operation of the filter element 1, the fluid L to be purified, for example, air or a liquid operating medium like oil, water, gasoline, diesel, kerosene, urea solution or the like, flows through the folded filter medium 5 from a raw side RO to a clean side RE thereof. A flow-through direction DR is oriented from the raw side RO in direction toward a clean side RE or from the first fold edges 12 in direction toward the second fold edges 13. The flow-through direction DR can also be oriented in opposite direction. In this case, the clean side RE is the raw side RO of the filter element 1 and vice versa.

As shown in FIGS. 1 to 3, the filter element comprises a support frame 2. The support frame 2 is manufactured of a plastic material, for example, a polyamide or an acrylonitrile butadiene styrene. The support frame 2 is an injection molded plastic component which is injection molded onto the filter bellows 3 by a plastics injection molding process. In this way, a fluid-tight and permanent connection between the folded bellows 3 and the support frame 2 is achieved. The support frame 2 comprises a rectangular frame section 16 to which the end folds 7, 8 of the folded bellows 3 are attached. Moreover, the support frame 2 comprises a bottom or first end disk section 17 and a top or second end disk section 18. The end disk sections 17, 18 are arranged spaced apart from each other and the folded bellows 3 is arranged between the end disk sections 17, 18. The end disk sections 17, 18 are arranged at the fold profiles 6 of the folded bellows 3 and close the folded bellows 3 off in a fluid-tight way at the end face, respectively. The end disk sections 17, 18 can comprise a semi-circular geometry. The fold profiles 6 are embedded in the end disk sections 17, 18.

The support frame 2 comprises moreover a support section 19 that is arranged in particular centrally between the end disk sections 17, 18. By means of the support section 19, the folded bellows 3 is centrally supported so that the latter does not collapse upon flow of the fluid L therethrough. The support section 19 is optional. When using the support section 19, particularly thin and unstable filter media 5 can be employed for the folded bellows 3. The support action of the fold sections 9, 10, 11 can be realized up to the respective fold base of the fold sections 9, 10, 11, i.e., up to the fold edges 12, 13. For this purpose, the support section 19 comprises support ribs 20, 21 of which in FIG. 3 only two are provided with a reference character.

At the top side, i.e., facing away from the first end disk section 17, a tubular connecting socket 22 with circular cross section is protruding from the second end disk section 18 and is formed as one piece together with the second end disk section 18. The connecting socket 22 is provided centrally at the second end disk section 18. The connecting socket 22 comprises an annular flange 23 with a circumferentially extending annular groove 24. A sealing element 25, for example an O-ring, is received in the annular groove 24. By means of the sealing element 25, the filter element 1 can be sealed relative to a filter receptacle to be explained in more detail in the following.

The support frame 2 comprises also a fluid guiding channel 26 that protrudes, like the flange 23, at the top side from the second end disk section 18. In FIG. 1, a section of the fluid guiding channel 26 of the top end disk (18) is referenced by 26A. By means of the fluid guiding channel section 26A, the filtered fluid L is transported opposite to the flow-through direction DR in an outflow direction AR toward the flange 23 and is guided along the face of the second end disk section 18. In the flange 23, the filtered fluid L is again deflected, for example, by 90°, relative to the outflow direction AR. The fluid guiding channel 26 is arranged above the second end disk section 18 so that the second end disk section 18 is positioned between the fluid guiding channel 26 and the filter bellows 3. In the orientation of FIGS. 1 and 2, the fluid guiding channel 26 is positioned above the second end disk section 18.

The filter element 1 comprises a cover element 4 illustrated in FIG. 5. The cover element 4, like the support frame 2, is manufactured of plastic material. The cover element 4 can be manufactured of the same material as the support frame 2. The cover element 4 is an injection molded plastic component. The cover element 4 is fixedly and fluid-tightly connected with the support frame 2, in particular the frame section 16. For example, the cover element 4 can be glued or welded to the support frame 2. The cover element 4 comprises an arc-shaped, in particular circular arc-shaped, curved wall section 27 and two spaced-apart plate-shaped end sections 28, 29 between which the wall section 27 is arranged and that are formed as one piece together with the wall section 27. At an interface 30 of the cover element 4 and of the support frame 2, a circumferentially extending rib 31 can be provided at the cover element 4 which is configured to engage by form fit a groove which is provided at the frame section 16 and the connecting section 22 of the support frame 2. This facilitates mounting of the cover element 4 at the support frame 2.

The support frame 2 and the cover element 4, as shown in FIG. 1, form together a circular cylinder-shaped outer geometry of the filter element 1 which is of rotation symmetry relative to a rotational or center axis $M_1$. The cover element 4 encloses together with the support frame 2 a clean fluid region 32 of the filter element 1. The cover element 4 and the support frame 2 form together an outer closure or a type of housing 33 of the filter element 1. One can also speak of a housing element 4.

Figure 6:
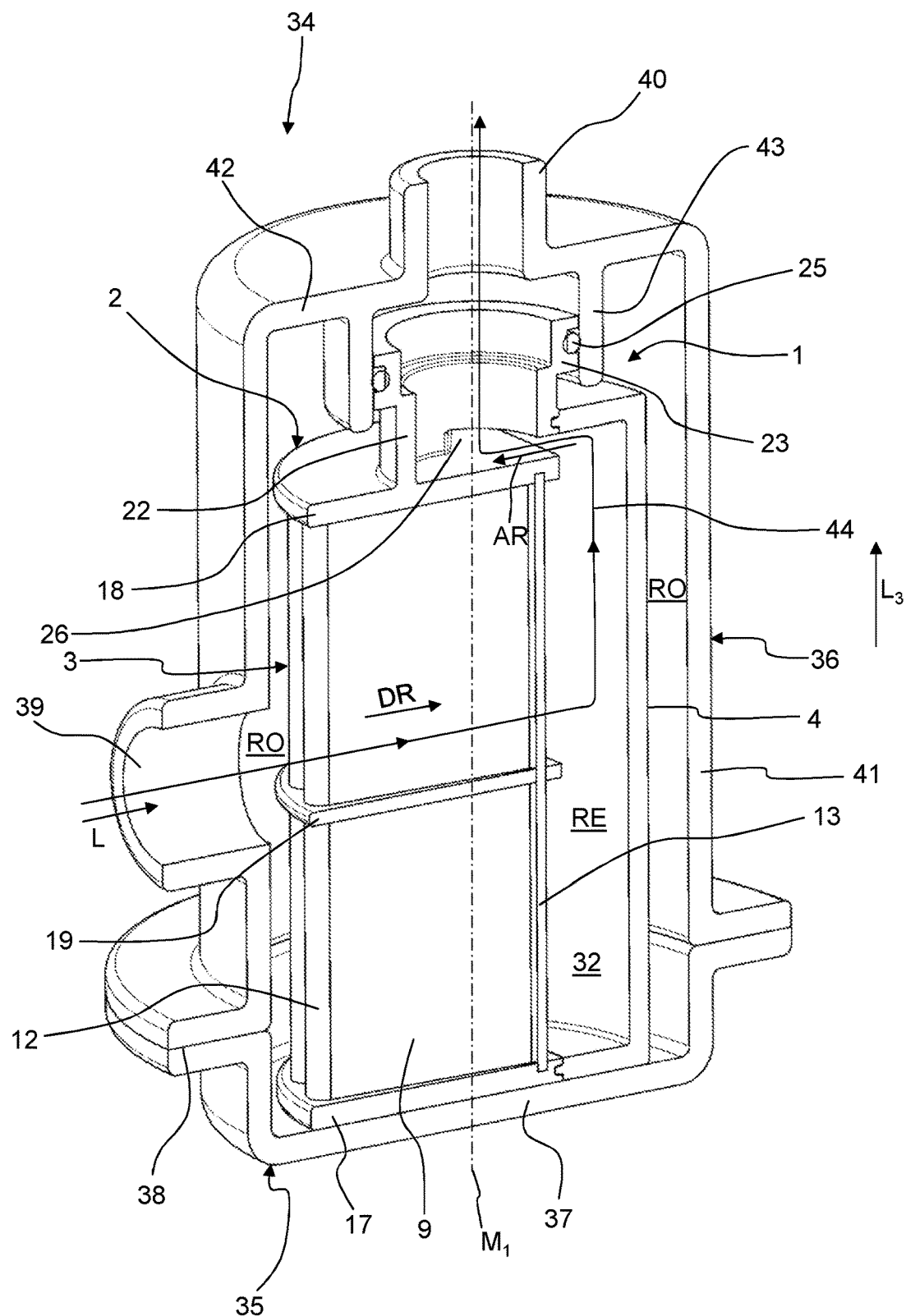
FIG. 6 is a schematic, perspective view of an embodiment of a filter assembly with a filter element according to FIG. 1.

FIG. 6 shows a schematic, perspective section view of an embodiment of a filter assembly 34 with such a filter element 1. The filter assembly 34 comprises a filter housing or a filter receptacle 35 in which the filter element 1 is received. The filter receptacle 35 can be of a multi-part configuration and comprises a cup-shaped receiving element 36 as well as a cup-shaped cover 37 that are connected fluid-tightly to each other at an interface 38. The filter receptacle 35 comprises a tubular inflow socket 39 and a tubular outflow socket 40. The fluid L flows through the inflow socket 39 into the filter receptacle 35 and through the outflow socket 40 out again. The fluid L can also flow in opposite direction so that the inflow socket 39 is an outflow socket and the outflow socket 40 is an inflow socket. The inflow socket 39 is positioned perpendicular to the outflow socket 40. The inflow socket 39 is provided at a tubular wall section 41 of the receiving element 36 and extends in radial direction laterally away from it. The outflow socket 40 is centrally provided at a cover section 42 of the receiving element 36 and protrudes from it at the top side. At the bottom side, i.e., opposite the outflow socket 40, a receiving region 43 is provided at the cover section 42 for receiving the flange 23 of the filter element 1. The sealing element 25 seals the flange 23 fluid-tightly in radial direction relative to the receiving region 43. The first end disk section 17 of the support frame 2 is contacting the cover 37 in this context. When exchanging the filter element 1, the cover 37 is removed and the filter element 1 is pulled out of the receiving element 36.

The functionality of the filter element 1 or of the filter assembly 34 will be explained in the following. Fluid L to be purified flows in the flow-through direction DR from the raw side RO of the filter element 1 through the folded bellows 3 to the clean side RE whereby materials to be filtered out such as dust or sand are removed from the fluid L. In the clean fluid region 32, the purified fluid L is deflected so that it flows in the longitudinal direction $L_3$ in the direction toward the second end disk section 18. At the second end disk section 18, the fluid L flows into the fluid guiding channel 26 in the outflow direction AR opposite to the flow-through direction DR. One can say that in the illustrated configuration, the collecting chamber 32 for the clean fluid is part of the fluid guiding channel 26. In this context, the fluid L flows along the second end disk section 18 at a face thereof which is facing away from the folded bellows 3, in particular a top side. The fluid L is again deflected in the connecting socket 22 in order to flow then in longitudinal direction $L_3$ out of the connecting socket 22. A flow path 44 of the fluid L through the filter element 1 or through the filter assembly 34 is indicated in FIGS. 2 and 6 by means of an arrow.

Since the connecting socket 22 is provided centrally at the second end disk section 18, the filter element 1 can be inserted into filter receptacles 35 configured for known filter elements with star-shaped folded bellows. In this way, a wide field of application for the filter element 1 is ensured. In comparison to a filter element comprising a folded bellows folded in a star shape, the described filter element 1 has a significantly enlarged surface area of the filter medium 5 because the fold sections 9, 10, 11 can be folded more tightly by eliminating the star-shaped folding.

Figure 7:
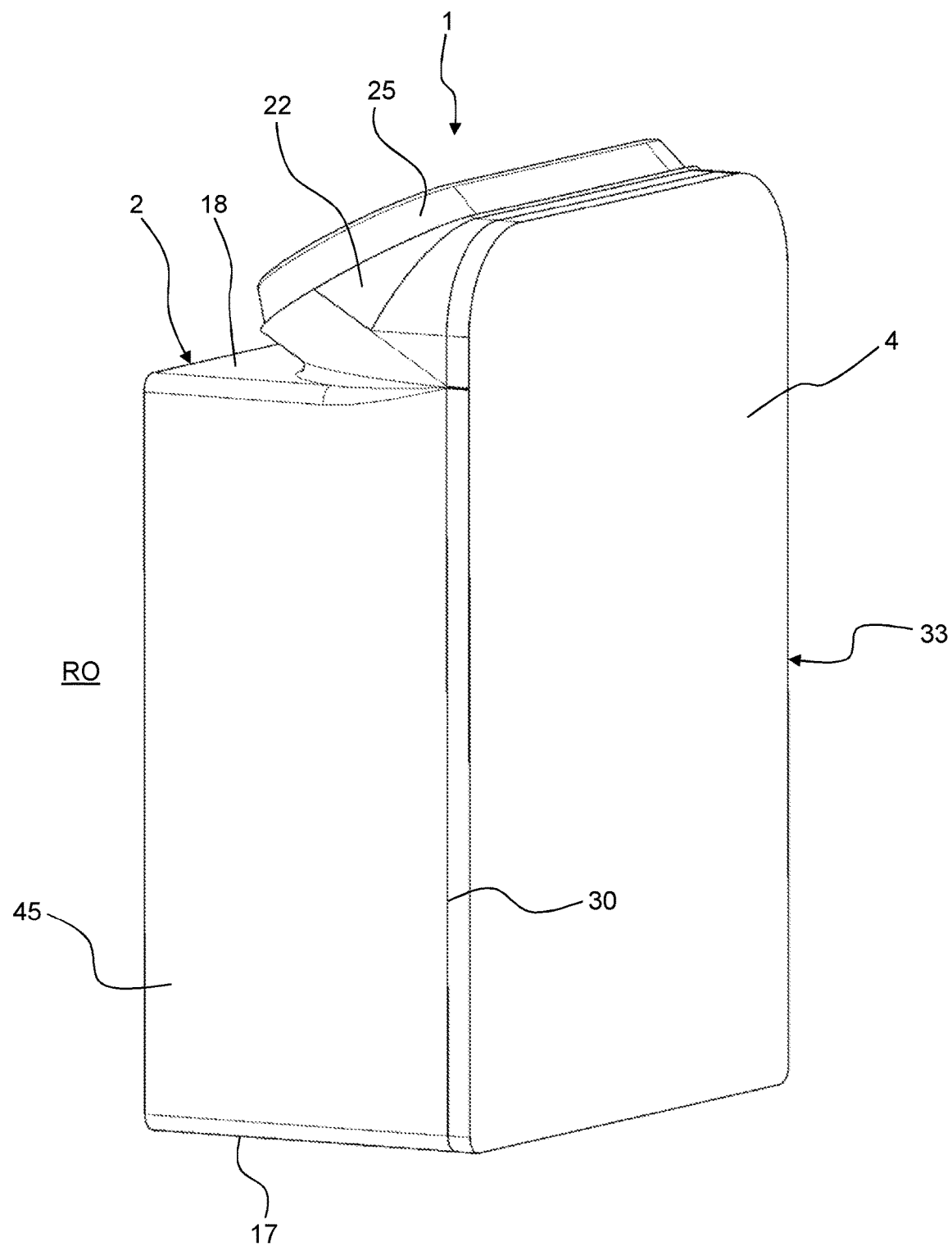
FIG. 7 is a schematic, perspective view of a further embodiment of a filter element.
Figure 8:
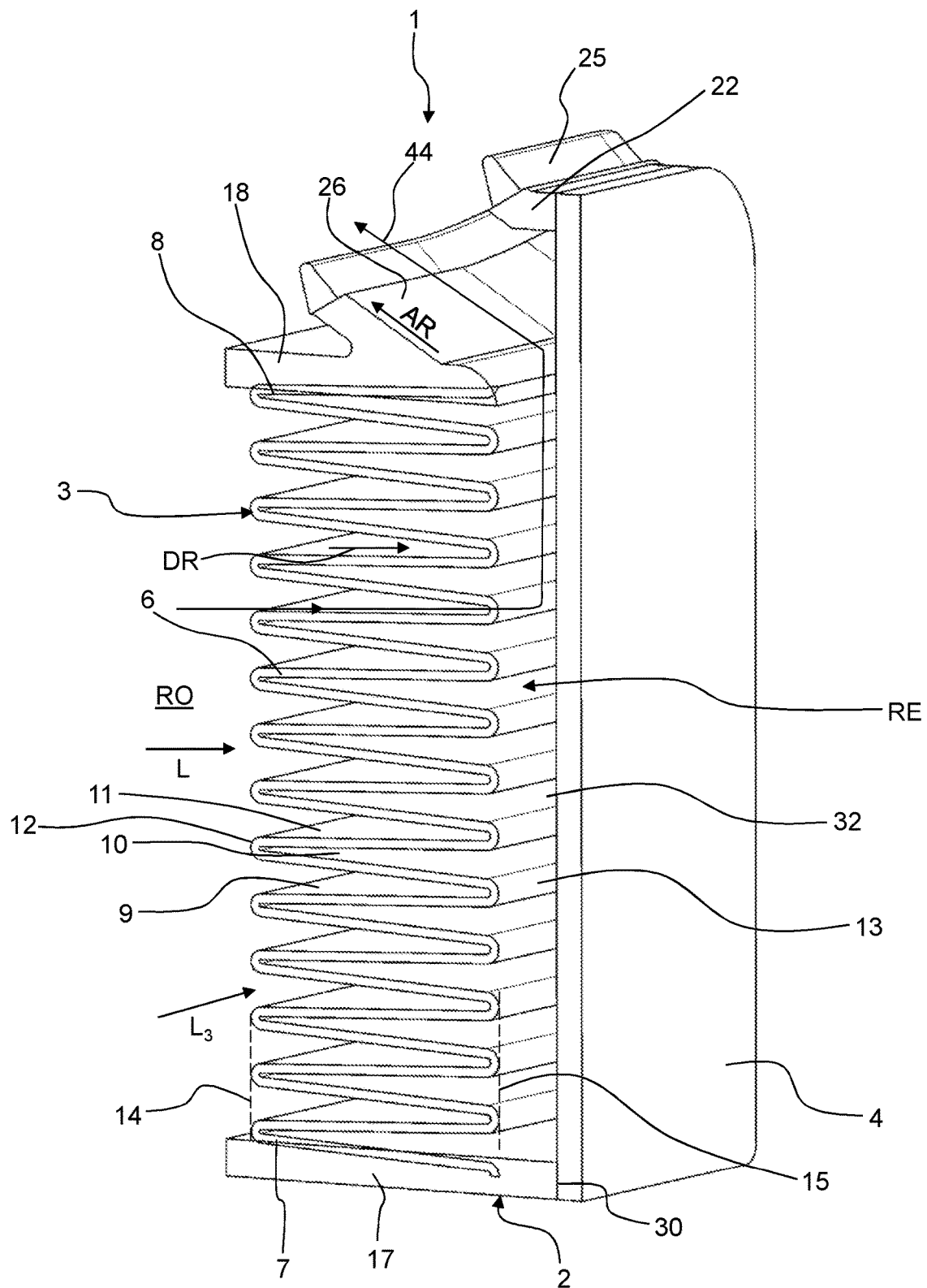
FIG. 8 shows a schematic, perspective section view of a filter element according to FIG. 7.

FIG. 7 shows a schematic perspective view of a further embodiment of a filter element 1. FIG. 8 shows a schematic perspective section view of the filter element 1 according to FIG. 7. In the following, reference is being had simultaneously to FIGS. 7 and 8. In the illustrated embodiment, the end disk sections 17, 18 are attached to end fold sections 7, 8 and not to the fold profiles, as has been indicated in the preceding Figures.

The filter element 1 according to FIGS. 7 and 8 differs from the filter element 1 according to FIGS. 1 through 5 moreover in that the folded bellows 3 has no variable but a constant fold height. This means that the fold sections 9, 10, 11 are all of the same length. The envelopes 14, 15 are each provided by a straight line. The geometric volume which is enclosed by the filter medium corresponds to a parallelepiped. Moreover, the folded bellows 3 is arranged such that the end folds 7, 8 are fixedly connected with rectangular end disk sections 17, 18 of the support frame 2. This means that the longitudinal direction of the fold pack $L_3$ is rotated by 90° in comparison to the filter element 1 according to FIGS. 1 through 5. The fold profile 6 is closed off with rectangular side sections 45 of the support frame 2 arranged on either side of the folded bellows 3.

The connecting socket 22 comprises a rectangular cross section and is not centrally provided at the second end disk section 18 but laterally provided thereat. The connecting socket 22 is moreover positioned at a slant, for example, at an angle of 45°, relative to the second end disk section 18 and projects in the orientation of FIGS. 7 and 8 at a slant upwardly. A sealing element 25 in the form of a sealing lip is provided circumferentially about the connecting socket 22. The sealing element 25 can be manufactured of an elastic deformable plastic material, for example, a thermoplastic elastomer. The sealing element 25 can be injection molded onto the support frame 2 by a plastics injection molding process.

The fluid guiding channel 26 that guides the filtered fluid L along the second end disk section 18 is integrated into the connecting socket 22. The outflow direction AR is oriented opposite to the flow-through direction DR wherein the outflow direction AR is arranged at a slant relative to the flow-through direction DR. A plate-shaped rectangular housing element 4 fluid-tightly seals off the support frame 2 at the rear for forming a clean fluid region 32.

Figure 9:
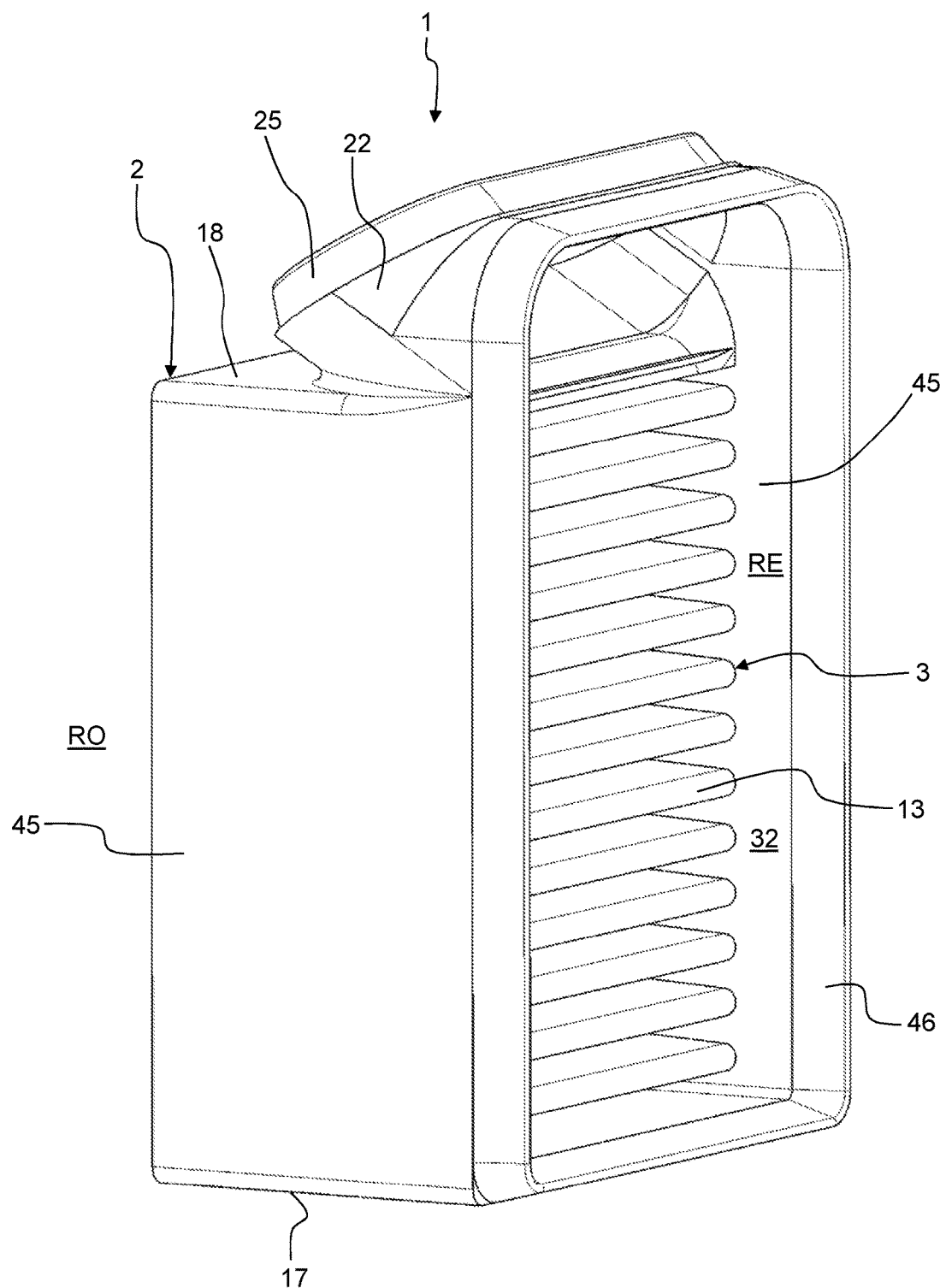
FIG. 9 is a schematic, perspective view of a further embodiment of a filter element.
Figure 10:
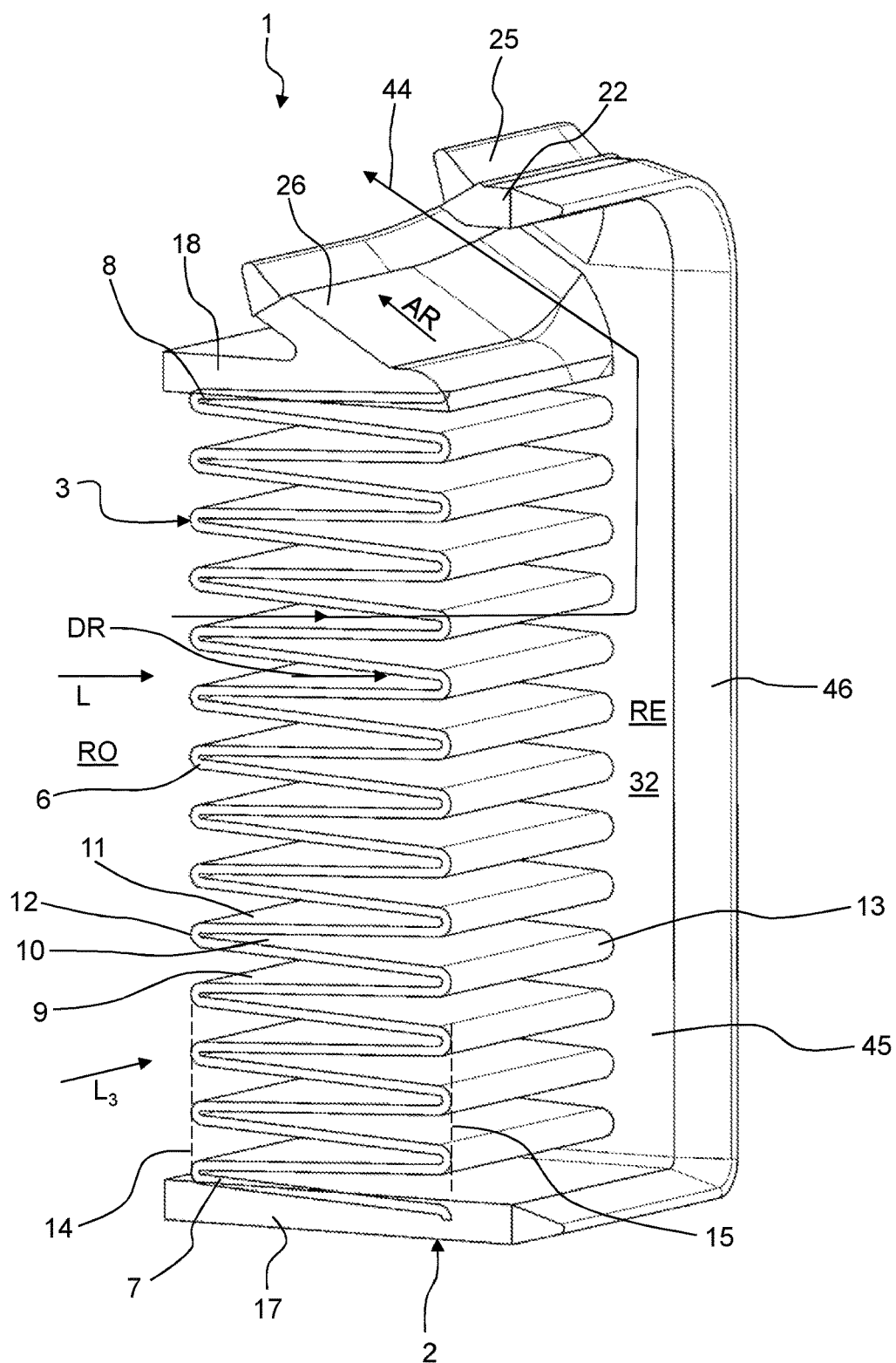
FIG. 10 shows a schematic, perspective section view of the filter element according to FIG. 9.

FIG. 9 shows a schematic, perspective view of a further embodiment of a filter element 1. FIG. 10 shows a schematic, perspective section view of the filter element 1 according to FIG. 9. In the following, reference is being had simultaneously to FIGS. 9 and 10.

The filter element 1 according to FIGS. 9 and 10 differs from the filter element 1 according to FIGS. 7 and 8 substantially in that the housing element 4 is not used. Instead of the housing element 4, at the rear of the support frame 2 a circumferentially extending sealing element 46 is provided. The sealing element 46 can be manufactured of an elastic deformable plastic material, for example, of a thermoplastic elastomer. The sealing element 46 can be injection molded onto the support frame 2 by a plastics injection molding process. By means of the sealing element 46, the filter element 1 can be sealed relative to a housing wall of a corresponding filter receptacle for the filter element 1. The housing element 4 is therefore not needed.

The proposed filter elements enable in particular the use of filter media that are not folded in a star shape, can realize a large filter surface area, and provide a good edge sealing action when manufactured in an injection molding tool by injection molding around the filter medium.

Even though the present invention has been described with the aid of different exemplary embodiments, it is not limited thereto, but can be modified in many ways. The illustrated geometries can be changed. For example, the folded bellows 3 of the filter elements 1 according to FIGS. 7 and 9 can be rotated such that the fold profiles 6 and not the end folds 7, 8 are fixedly connected to the end disk sections 17, 18 of the support frame 2.

What is claimed is:

1. A filter element comprising:
a support frame comprising:
a first end disk arranged at a first axial end of the support frame;
a second end disk arranged at a second axial end of the support frame;
wherein the first end disk and the second end disk comprise an axially inner surface and an axially outer surface;
a folded filter medium having:
folds of the folded filter medium forming a plurality of outer fold edges at a first flow face of the folded filter medium, and a plurality of inner fold edges at an opposite second flow face of the folded filter medium;
wherein the fold edges extend from a first fold profile end to an opposite second fold profile end of the folded filter medium;
wherein a first axial end of the folded filter medium is embedded into the axially inner surface of the first end disk of the support frame, the first end disk covering the first axial end of the folded filter medium;
wherein a second axial end of the folded filter medium is embedded into the axially inner surface of the second end disk of the support frame, the second end disk covering the second axial end of the folded filter medium;
wherein the folded filter medium is entirely arrange between the first end disk and the second end disk of the support frame;
wherein the folded filter medium is embedded into material of the support frame, thereby securely mounting the folded filter medium into the material of the support frame;
a cover arranged at a spacing from the second flow face of the folded filter medium and closing over the second flow face of the folded filter medium, the cover together with the folded filter medium, enclosing a clean fluid flow region formed by the spacing at the second flow face of the folded filter medium, the cover secured onto the first end disk and the second end disk and extending axially from the first end disk to the second end disk;
wherein the cover cooperates with the second end disk to enclose and form a fluid guiding channel extending from the clean fluid flow region at the second flow face of the folded filter medium, the fluid guiding channel continuing on the axially outer surface of the second end disk to discharge filtered fluid from the filter element.

2. The filter element according to claim 1, wherein the support frame is injection molded onto the filter medium by a plastics injection molding process.

3. The filter element according to claim 1, wherein the fluid guiding channel is configured to guide the fluid, when the fluid flow passes through the filter medium, such that an outflow direction of the fluid through the fluid guiding flow channel is arranged opposite to a flow-through direction of the fluid through the filter medium.

4. The filter element according to claim 3, wherein the flow-through direction of the fluid through the filter medium is arranged perpendicular to fold edges of the filter medium.

5. The filter element according to claim 1, wherein the cover is welded or glued to the support frame.

6. The filter element according to claim 1, wherein the filter element comprises a circular cylinder-shaped geometry and
further comprises a connecting socket arranged on the axially outer surface of the second end disk,
wherein the connecting socket is configured to connect the filter element to a filter receptacle and is arranged centrally relative to the cylinder-shaped geometry.

7. The filter element according to claim 6, wherein the fluid guiding channel is fluidically connected to the connecting socket.

8. The filter element according to claim 1, wherein the support frame further comprises
a support section arranged between the first end disk and the second end disk, wherein the support section comprises support ribs configured to support fold sections of the filter medium.

9. A filter assembly comprising a filter receptacle and a filter element according to claim 1, the filter element exchangeably arranged in the filter receptacle.

* * * * *